(12) United States Patent
Nishizawa (10) Patent No.: US 9,023,200 B2
(45) Date of Patent: May 5, 2015

(54) ROTARY-DRUM TYPE MAGNETIC SEPARATOR

(71) Applicant: Sumitomo Heavy Industries Finetech, Ltd., Kurashiki-shi, Okayama (JP)

(72) Inventor: Shinya Nishizawa, Kurashiki (JP)

(73) Assignee: Sumitomo Heavy Industries Finetech, Ltd., Kurashiki-shi, Okayama (JP)

( * ) Notice: Subject to any disclaimer, the term of this patent is extended or adjusted under 35 U.S.C. 154(b) by 16 days.

(21) Appl. No.: 13/982,335

(22) PCT Filed: Feb. 5, 2013

(86) PCT No.: PCT/JP2013/052557
§ 371 (c)(1),
(2) Date: Jul. 29, 2013

(87) PCT Pub. No.: WO2013/132943
PCT Pub. Date: Sep. 12, 2013

(65) Prior Publication Data
US 2014/0083920 A1    Mar. 27, 2014

(30) Foreign Application Priority Data

Mar. 7, 2012 (JP) ................................. 2012-050156

(51) Int. Cl.
| | | |
|---|---|---|
| *B03C 1/02* | (2006.01) | |
| *B03C 1/033* | (2006.01) | |
| *B24B 55/12* | (2006.01) | |
| *B03C 1/14* | (2006.01) | |
| *B03C 1/28* | (2006.01) | |

(52) U.S. Cl.
CPC . *B03C 1/02* (2013.01); *B24B 55/12* (2013.01); *B03C 1/0332* (2013.01); *B03C 1/14* (2013.01); *B03C 1/284* (2013.01); *B03C 1/286* (2013.01); *B03C 2201/20* (2013.01)

(58) Field of Classification Search
CPC ............ B03C 1/02; B03C 1/14; B03C 1/284; B03C 1/286; B03C 1/0332; B03C 2201/20; B24B 55/12
See application file for complete search history.

(56) References Cited

U.S. PATENT DOCUMENTS

2008/0251435 A1* 10/2008 Tashiro et al. ................. 210/222

FOREIGN PATENT DOCUMENTS

| JP | 2001-029839 A | 2/2001 |
| JP | 2005-058880 A | 3/2005 |
| JP | 2007-000978 A | 1/2007 |

OTHER PUBLICATIONS

International Search Report and Written Opinion dated Mar. 5, 2013 corresponding to International Patent Application No. PCT/JP2013/052557.

*Primary Examiner* — David A Reifsnyder
(74) *Attorney, Agent, or Firm* — Squire Patton Boggs (US) LLP (57) ABSTRACT

A rotary-drum type magnetic separator includes a rotary drum on which a plurality of magnets are disposed, and separates an unnecessary material contained in used coolant. The magnetic separator includes a pair of partition portions that are provided below both end portions of the rotary drum and partition a flow passage, in which the used coolant flows, into a flow passage that is formed near the middle portion of the rotary drum and flow passages that are formed near both end portions of the rotary drum; and openings that are formed at lower portions of the flow passages partitioned by the partition portions. The partition portions function as filters preventing the unnecessary material from moving to the flow passages, which are formed near both end portions of the rotary drum, from the flow passage that is formed near the middle portion of the rotary drum.

6 Claims, 9 Drawing Sheets

ROTARY-DRUM TYPE MAGNETIC SEPARATOR

BACKGROUND

1. Technical Field

The present invention relates to a rotary-drum type magnetic separator that separates and recovers sludge contained in used coolant. More particularly, the present invention relates to a rotary-drum type magnetic separator that can prevent sludge from remaining in a flow passage formed near both end portions of a rotary drum that rotates.

Priority is claimed to Japanese Patent Application No. 2012-050156, filed Mar. 7, 2012, the entire content of each of which is incorporated herein by reference.

2. Description of the Related Art

Scraps, chips, and the like, which are discharged together with used coolant in the cutting, grinding, and the like of magnetic materials typified by metal materials, particularly, steel materials, are separated from a liquid component and recovered. Since the scraps, chips, and the like have various shapes, various magnetic separators (recovery devices) have been developed in terms of recovery efficiency.

Figure 1:
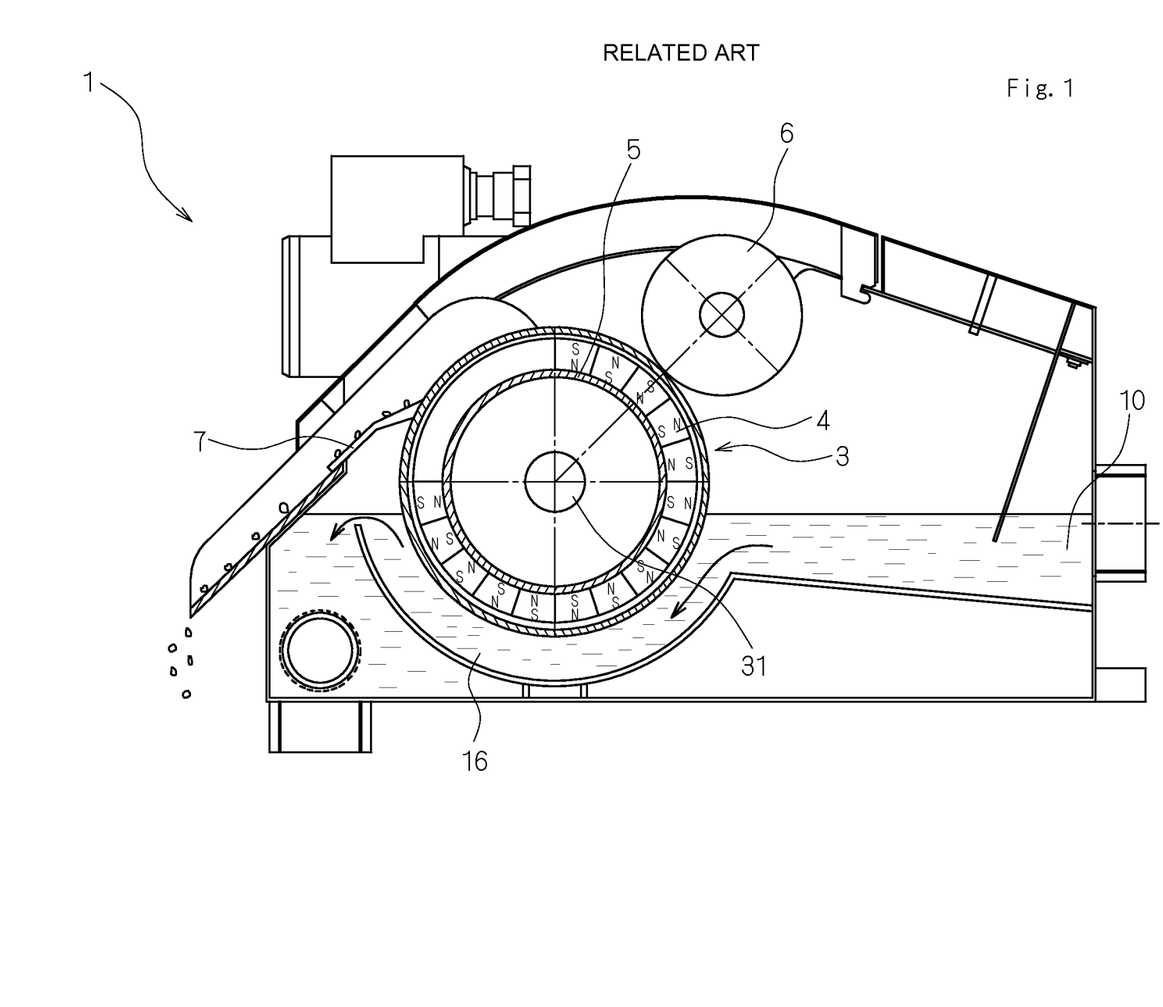
FIG. 1 is a cross-sectional view, which shows the structure of the rotary-drum type magnetic separator in the related art, taken along a plane orthogonal to the rotating shaft of a rotary drum.

For example, a rotary-drum type magnetic separator in the related art is disclosed. FIG. 1 is a cross-sectional view, which shows the structure of the rotary-drum type magnetic separator in the related art, taken along a plane orthogonal to the rotating shaft of a rotary drum. As shown in FIG. 1, the rotary-drum type magnetic separator in the related art includes a liquid storage portion 10 that is provided in a box-shaped body 1 and stores used coolant. A rotary drum 3 is supported near the middle portion of the body 1 so that the liquid storage portion 10 is divided into two portions and the rotary drum 3 can be rotated in a substantially horizontal direction. The rotary drum 3 is a cylindrical body that is made of a non-magnetic material such as stainless steel. An inner cylinder 5, which includes a plurality of magnets 4 disposed on the outer peripheral surface thereof in a predetermined arrangement, is coaxially fixed in an outer cylinder by a rotating shaft 31. The polarities of the plurality of magnets 4 are disposed to generate a predetermined magnetic flux near the outer peripheral surface of the rotary drum 3 so that the plurality of magnets 4 magnetically attract scraps, chips, and the like that are magnetic materials contained in the used coolant.

In the related art, the plurality of magnets 4 are disposed between a portion of the rotary drum 3, which is immersed in the liquid storage portion 10, and the top portion of the rotary drum, that is, on a portion of the inner cylinder 5 corresponding to a portion corresponding to about three quarters of the outer peripheral surface of the rotary drum 3. The magnets 4 are not disposed on the remaining portion of the inner cylinder 5 corresponding to about one quarter so that a magnetic force is not applied to the remaining portion of the inner cylinder.

Sludge, which is attracted to the outer peripheral surface of the rotary drum 3 at the bottom of the liquid storage portion 10 by the action of the magnetic forces of the plurality of magnets 4, is conveyed to the top portion of the rotary drum 3 with the rotation of the rotary drum 3. The conveyed sludge is released from the attractive forces, which are caused by the magnetic forces of the plurality of magnets 4, when passing through the top portion. Then, the conveyed sludge is scraped by a scraper 7, which comes into contact with the surface of the rotary drum 3, and is recovered. A squeezing roller 6, which is provided with an elastic body such as rubber on the surface thereof, is provided near the top portion of the rotary drum 3, and comes into contact with the outer peripheral surface of the rotary drum 3 at a predetermined pressure. While the attracted sludge passes between the rotary drum 3 and the squeezing roller 6, a liquid component contained in the sludge is squeezed. Then, only scraps, chips, and the like are separated at a position where a magnetic force is not applied.

SUMMARY

According to an embodiment of the present invention, there is provided a rotary-drum type magnetic separator that includes a rotary drum on which a plurality of magnets are disposed and separates an unnecessary material contained in used coolant. The rotary-drum type magnetic separator includes a pair of partition portions that are provided below both end portions of the rotary drum and partition a flow passage, in which the used coolant flows, into a flow passage that is formed near the middle portion of the rotary drum and flow passages that are formed near both end portions of the rotary drum; and openings that are formed at lower portions of the flow passages partitioned by the partition portions. The partition portions function as filters preventing the unnecessary material of the used coolant from moving to the flow passages, which are formed near both end portions of the rotary drum, from the flow passage that is formed near the middle portion of the rotary drum.

DETAILED DESCRIPTION

In the related art, used coolant containing sludge smoothly flows in a flow passage 16 formed near the middle portion of the rotary drum 3, so that sludge recovery performance as designed is displayed. However, since used coolant containing sludge does not smoothly flow in flow passages 16, which is formed near both end portions of the rotary drum 3, due to the generation of vortices, there is a problem in that sludge, which cannot be recovered at the bottom of the flow passage 16, remains and is deposited with time.

In order to solve such a problem, it is considered that openings are formed at the bottoms of the flow passages 16 formed near both end portions of the rotary drum 3 so that flows are also generated in the flow passages 16 formed near both end portions of the rotary drum 3. In this case, flows are also generated in the flow passages 16 formed near both end portions of the rotary drum 3 but a uniform flow is not generated as a whole. Accordingly, it is undeniable that it is difficult to improve the recovery efficiency of sludge.

It is desirable to provide a rotary-drum type magnetic separator that can inhibit sludge from remaining and being deposited on the bottoms of flow passages formed near both end portions of a rotary drum without causing the deterioration of the recovery efficiency of sludge.

In the embodiment, the rotary-drum type magnetic separator includes a rotary drum on which a plurality of magnets are disposed and separates an unnecessary material contained in used coolant. The rotary-drum type magnetic separator includes a pair of partition portions that are provided below both end portions of the rotary drum and partition a flow passage, in which the used coolant flows, into a flow passage that is formed near the middle portion of the rotary drum and flow passages that are formed near both end portions of the rotary drum. The rotary-drum type magnetic separator includes openings that are formed at lower portions of the flow passages partitioned by the partition portions. The partition portions function as filters preventing the unnecessary material of the used coolant from moving to the flow passages, which are formed near both end portions of the rotary drum, from the flow passage that is formed near the middle portion of the rotary drum. Accordingly, sludge, which is the unnecessary material, cannot pass through the partition portions and does not enter the flow passages formed near both end portions of the rotary drum, so that it is possible to inhibit sludge from remaining and being deposited near both end portions of the rotary drum. Even if sludge enters the flow passages that are formed near both end portions of the rotary drum, sludge can be discharged to the outside from the openings. Moreover, flows are also generated in the flow passages formed near both end portions of the rotary drum as in the flow passage formed near the middle portion of the rotary drum and a uniform flow can be generated as a whole. Accordingly, the deterioration of the recovery efficiency of sludge is not caused.

Further, in the rotary-drum type magnetic separator according to the embodiment, the partition portion may be made of a plate-like non-woven fabric and may be formed so that an end portion of the partition portion comes into contact with the outer peripheral surface of the rotary drum.

In this embodiment, since the partition portion is made of a plate-like non-woven fabric, for example, a plate-like felt material and is formed so that an end portion of the partition portion comes into contact with the outer peripheral surface of the rotary drum, a gap is not formed between the outer peripheral surface of the rotary drum and the partition portion and sludge adheres to the plate-like non-woven fabric. Accordingly, sludge does not enter the flow passages that are formed near both end portions of the rotary drum. As a result, it is possible to inhibit sludge from remaining and being deposited in the flow passages that are formed near both end portions of the rotary drum.

Furthermore, in the rotary-drum type magnetic separator according to the embodiment, the plate-like non-woven fabric of the partition portion may be interposed between two plate-like steel members.

In this embodiment, since the plate-like non-woven fabric of the partition portion is interposed between two plate-like steel members, it is possible to reduce the early degradation of the non-woven fabric, which is caused by the contact between the rotary drum and the non-woven fabric, even though the non-woven fabric has a relatively low strength. Accordingly, it is possible to inhibit sludge from entering the flow passages that are formed near both end portions of the rotary drum.

Moreover, in the rotary-drum type magnetic separator according to the embodiment, the partition portion may be formed of one or a plurality of plate-like rubber members and the plate-like rubber members may be disposed in parallel at a predetermined interval when the partition portion is formed of the plurality of plate-like rubber members.

In this embodiment, the partition portion is formed of one or a plurality of plate-like rubber members, and the plate-like rubber members are disposed in parallel at a predetermined interval when the partition portion is formed of the plurality of plate-like rubber members. Since the partition portion is formed of a plate-like rubber member, the outer peripheral surface of the rotary drum 3 and the end portion of the partition portion can easily come into contact with each other. Since the outer peripheral surface of the rotary drum and the end portion of the partition portion come into contact with each other, a gap is not formed between the partition portion and the outer peripheral surface of the rotary drum. Therefore, sludge does not enter the flow passages that are formed near both end portions of the rotary drum. As a result, it is possible to inhibit sludge from remaining and being deposited in the flow passages formed near both end portions of the rotary drum. Further, even if sludge enters, sludge sinks in the gaps between the plurality of plate-like rubber members since the plurality of plate-like rubber members are disposed in parallel at a predetermined interval. Accordingly, sludge does not enter the flow passages that are formed near both end portions of the rotary drum. As a result, it is possible to inhibit sludge from permeating the drive chambers.

Furthermore, in the rotary-drum type magnetic separator according to the embodiment, the partition portion may be formed of one or a plurality of plate-like steel members and the plate-like steel members may be disposed in parallel at a predetermined interval when the partition portion is formed of the plurality of plate-like steel members.

In this embodiment, the partition portion is formed of one or a plurality of plate-like steel members and the plate-like steel members are disposed in parallel at a predetermined interval when the partition portion is formed of the plurality of plate-like steel members. Since the plurality of plate-like steel members are disposed in parallel at a predetermined interval, sludge, which passes through the gaps between the outer peripheral surface of the rotary drum and the end portions of the plate-like steel members, sinks in the gaps between the plurality of plate-like steel members disposed at a predetermined interval. Accordingly, sludge does not enter the flow passages that are formed near both end portions of the rotary drum. As a result, it is possible to inhibit sludge from permeating the drive chambers.

Moreover, in the rotary-drum type magnetic separator according to the embodiment, the partition portion may be formed by filling a gap, which is formed between two plate-like steel members, with at least one of a resin material and a rubber material.

In this embodiment, since the partition portion is formed by filling a gap, which is formed between two plate-like steel members, with at least one of a resin material and a rubber material, the outer peripheral surface of the rotary drum and the end portion of the partition portion can easily come into contact with each other. Since the outer peripheral surface of the rotary drum and the end portion of the partition portion come into contact with each other, a gap is not formed between the partition portion and the outer peripheral surface of the rotary drum. Therefore, sludge does not enter the flow passages that are formed near both end portions of the rotary drum. As a result, it is possible to inhibit sludge from remaining and being deposited in the flow passages formed near both end portions of the rotary drum.

According to the above-mentioned structures, the partition portions function as filters preventing an unnecessary material, which is contained in the used coolant, from moving to the flow passages, which are formed near both end portions of the rotary drum, from the flow passage that is formed near the middle portion of the rotary drum. Accordingly, sludge, which is an unnecessary material, cannot pass through the partition portions and does not enter (permeate) the flow passages that are formed near both end portions of the rotary drum. As a result, it is possible to inhibit sludge from remaining and being deposited near both end portions of the rotary drum. Even if sludge enters the flow passages formed near both end portions of the rotary drum, sludge can be discharged to the outside from the openings. Moreover, flows are also generated in the flow passages formed near both end portions of the rotary drum as in the flow passage formed near the middle portion of the rotary drum and a uniform flow can be generated as a whole. Accordingly, the deterioration of the recovery efficiency of sludge is not caused.

The invention will be described in detail below with reference to the drawings showing embodiments thereof.

First Embodiment

Figure 2:
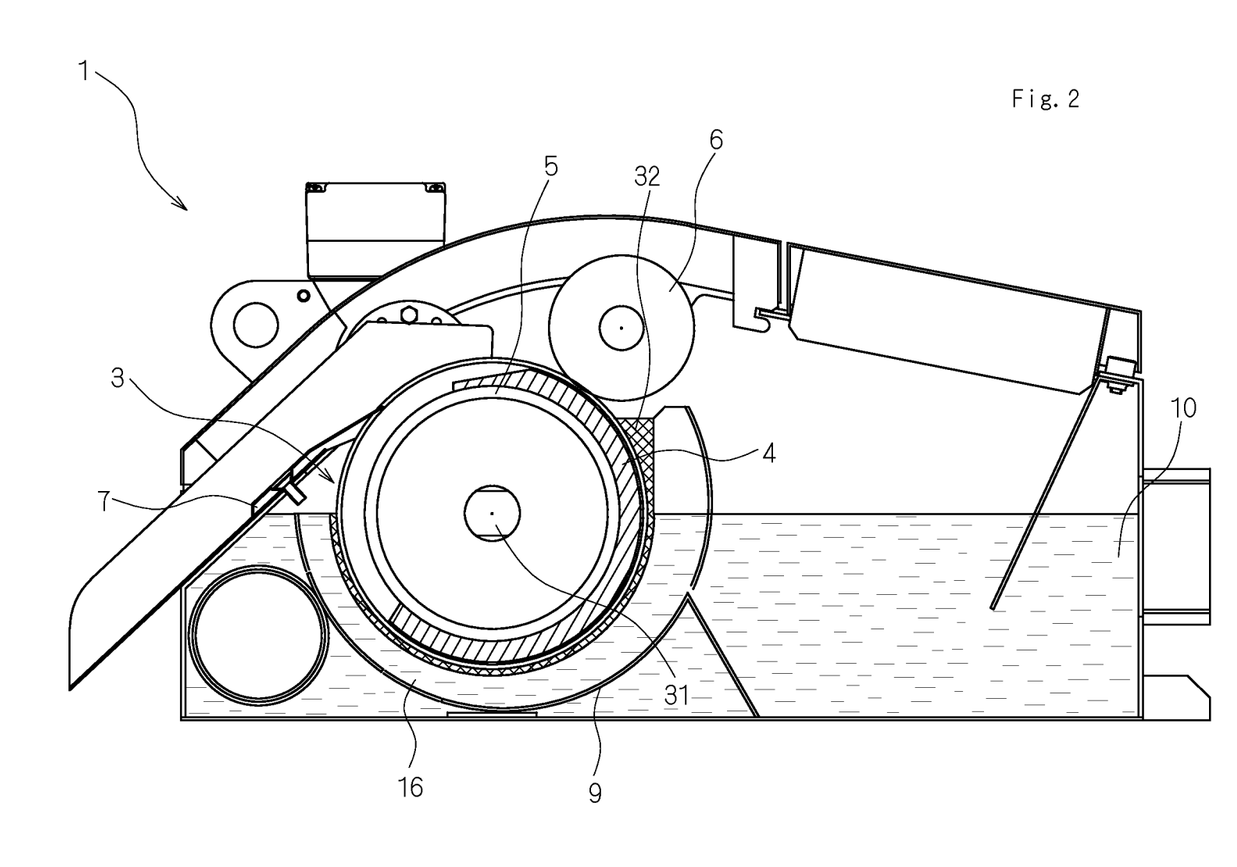
FIG. 2 is a cross-sectional view, which shows the structure of a rotary-drum type magnetic separator according to a first embodiment of the invention, taken along a plane orthogonal to a rotating shaft of a rotary drum.

FIG. 2 is a cross-sectional view, which shows the structure of a rotary-drum type magnetic separator according to a first embodiment of the invention, taken along a plane orthogonal to a rotating shaft of a rotary drum. As shown in FIG. 2, the rotary-drum type magnetic separator according to the first embodiment includes a liquid storage portion 10 that is provided in a box-shaped body 1 and stores used coolant. A rotary drum 3 is supported near the middle portion of the body 1 by a rotating shaft 31 so that the liquid storage portion 10 is divided into two portions and the rotary drum 3 can be rotated in a substantially horizontal direction.

The rotary drum 3 is a cylindrical body that is made of a non-magnetic material such as stainless steel. On the outer peripheral surface of the rotary drum 3, an inner cylinder 5 on which a plurality of magnets 4 are disposed is coaxially fixed in an outer cylinder by the rotating shaft 31. The magnetic poles of the plurality of magnets 4 disposed on the inner cylinder 5 are appropriately adjusted so that the plurality of magnets 4 apply required magnetic forces to the outer peripheral surface of the rotary drum 3. In the first embodiment, neodymium magnets are used as the magnets 4 and the magnets are disposed from one end of a squeezing roller 6 so that the magnetic poles are arranged in the order of N, S, N, and S while N and S make a pair.

A range of the outer peripheral surface of the rotary drum 3 to which the magnetic forces are applied varies depending on the outer diameter of the drum, the position of a scraper 7, and the like. In FIG. 2, the plurality of magnets 4 are disposed on the inner cylinder 5 so as to apply attractive forces to about three quarters of the outer peripheral surface of the rotary drum 3 between a portion of the rotary drum 3 immersed in the liquid storage portion 10 and the top portion of the rotary drum, and are not disposed on the inner cylinder 5 corresponding to about one quarter of, that is, the remaining portion of the outer peripheral surface of the rotary drum. Sludge (unnecessary material), which is attracted to the outer peripheral surface of the rotary drum 3 in a flow passage 16 to which magnetic forces are applied and contains scraps, chips, and the like, is conveyed to the top portion of the rotary drum 3 by the rotation of the rotary drum 3. The conveyed sludge is released from the attractive forces, which are caused by the magnetic forces of the plurality of magnets 4, when passing through the top portion. Then, the conveyed sludge is scraped by the plate-like scraper 7, which comes into contact with the surface of the rotary drum 3, and is recovered.

The squeezing roller 6 is disposed close to the top portion of the rotary drum 3, and comes into contact with the outer peripheral surface of the rotary drum 3 at a predetermined pressure. It is possible to squeeze a liquid component from the sludge that contains scraps, chips, and the like and is conveyed while being attracted to the outer peripheral surface of the rotary drum 3, by the squeezing roller 6.

Meanwhile, after being stored in the liquid storage portion 10 at first, the used coolant passes through the flow passage 16 which is formed by the rotary drum 3 and a casing bottom plate 9 disposed along the rotary drum 3 and to which magnetic forces are applied. While the used coolant passes through the flow passage 16, scraps, abrasive grains, and the like, which are magnetic materials contained in the coolant, are separated or recovered by the magnetic forces.

Further, openings 8 (see FIG. 3) are formed at a part of the surface of the rotary drum 3 facing the outer cylinder. The openings 8 are formed at the bottom of the flow passage 16 near both end portions of the rotating shaft 31 of the rotary drum 3, in the direction substantially orthogonal to the direction of the rotating shaft 31 of the rotary drum 3. The openings 8 are formed by forming openings, which have a predetermined width, first at a flat plate, which is made of stainless steel (SUS304), in the thickness direction with a laser or a turret punch and then bending the flat plate in an arc shape.

Figure 3:
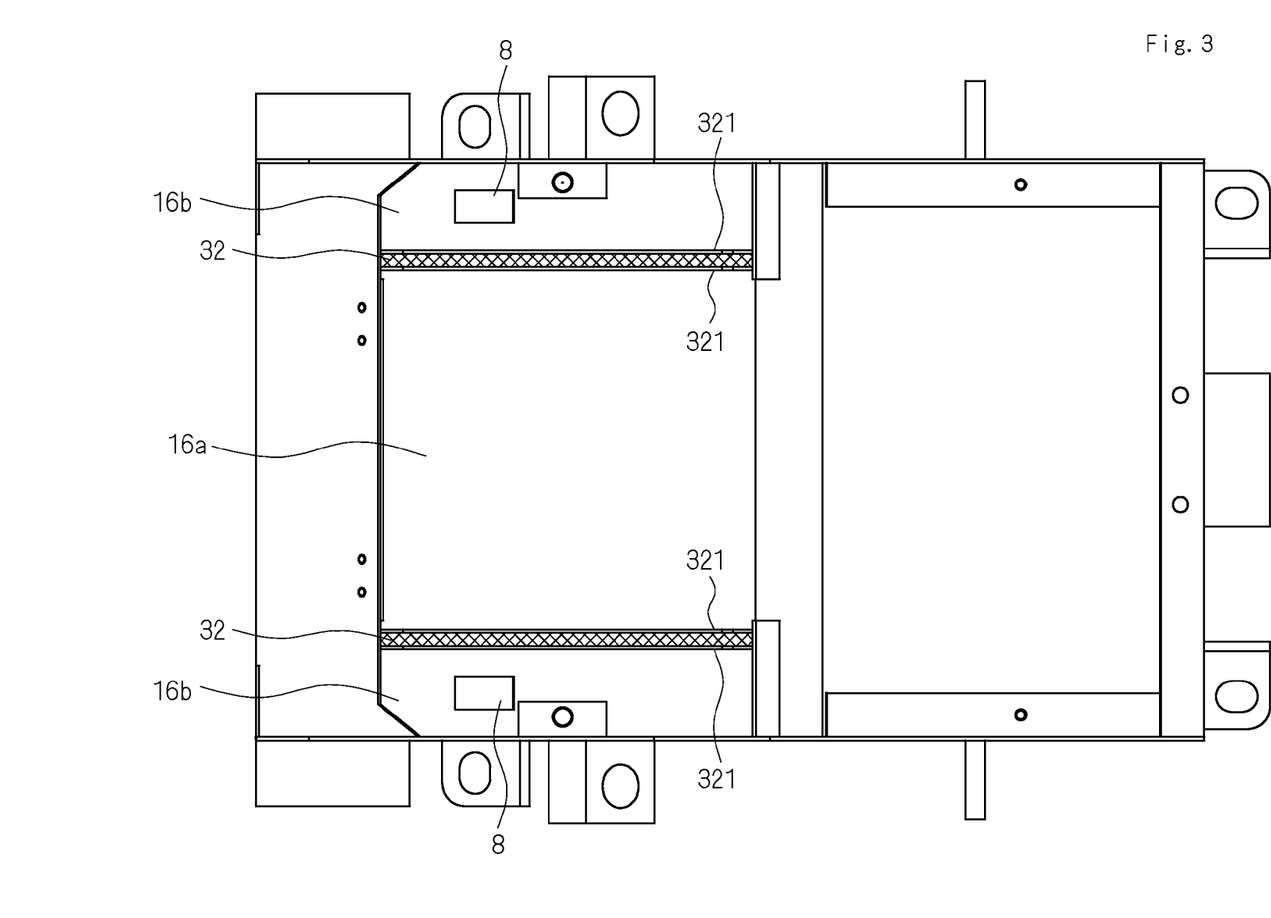
FIG. 3 is a plan view showing the structure of the rotary-drum type magnetic separator according to the first embodiment of the invention.

FIG. 3 is a plan view showing the structure of the rotary-drum type magnetic separator according to the first embodiment of the invention. FIG. 3 is a view showing the bottom of the rotary-drum type magnetic separator when seen from the bottom side.

As shown in FIG. 3, the respective openings 8 are formed near both end portions of the rotary drum 3 below a position where the rotary drum 3 is installed. A pair of partition portions 32 are formed so as to partition both end portions, which include the respective openings 8, of the flow passage and the middle portion of the flow passage, that is, so as to partition the flow passage 16, in which the used coolant flows, into a flow passage 16a that is formed near the middle portion of the rotary drum 3 and flow passages 16b that are formed near both end portions of the rotary drum.

A gap is formed between two plate members (plate-like steel members) 321 of each of the partition portions 32, and, for example, a non-woven fabric material such as felt is inserted into the gap between the two plate members 321. The material inserted into the gap is not limited to a non-woven fabric material such as felt, and a rubber material or a resin material having high viscosity may be inserted into the gap. Of course, a material into which sludge contained in the used coolant does not permeate may be inserted into the gap, and a material into which only coolant permeates may be inserted into the gap.

Figure 4:
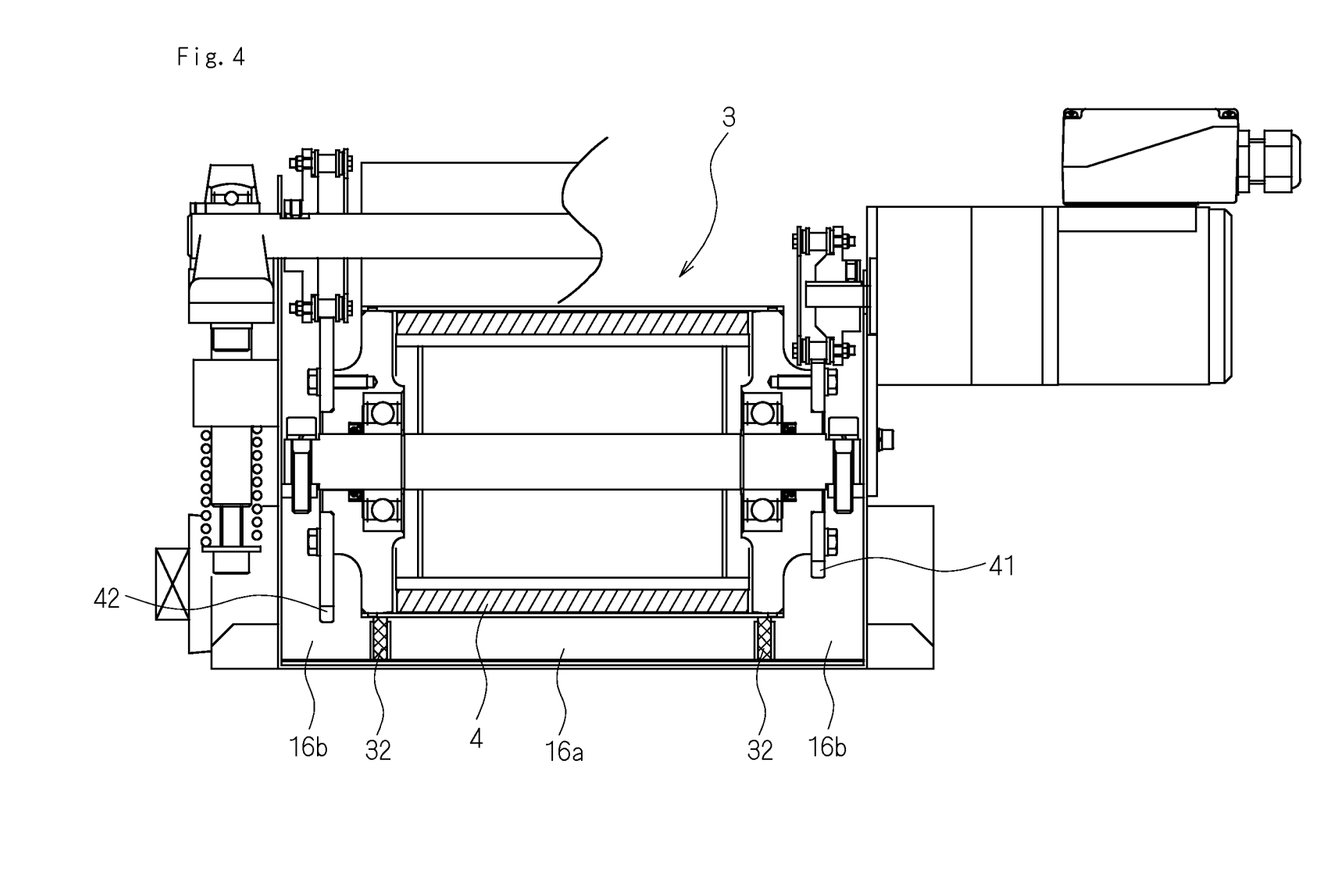
FIG. 4 is a cross-sectional view, which shows the structure of the rotary-drum type magnetic separator according to the first embodiment of the invention, taken along a vertical plane passing through the central axis of the rotary drum.

FIG. 4 is a cross-sectional view, which shows the structure of the rotary-drum type magnetic separator according to the first embodiment of the invention, taken along a vertical plane passing through the central axis of the rotary drum 3. As shown in FIG. 4, the flow passage 16 in which the used coolant flows is formed in the middle portion of the rotary drum 3, and drive chambers, which receive a driving sprocket 41 and a driven sprocket 42 transmitting the rotation of a motor rotating the rotary drum 3, are formed at both end portions of the rotary drum 3 by the partition portions 32. The drive chambers are filled with coolant but sludge, which is an unnecessary material contained in the used coolant, is blocked by the partition portions 32. Accordingly, sludge cannot permeate the drive chambers. Therefore, it is possible to reduce degradation that occurs due to the abrasion or the like of the driving sprocket 41 or the driven sprocket 42 caused by sludge. Further, the openings 8 are formed at the lower portions of the drive chambers that are partitioned at both end portions of the rotary drum 3 by the partition portions 32. Accordingly, even if sludge, which cannot be separated by the partition portions 32, permeates the drive chambers, the sludge can be reliably discharged to the outside through the openings 8.

Figure 5:
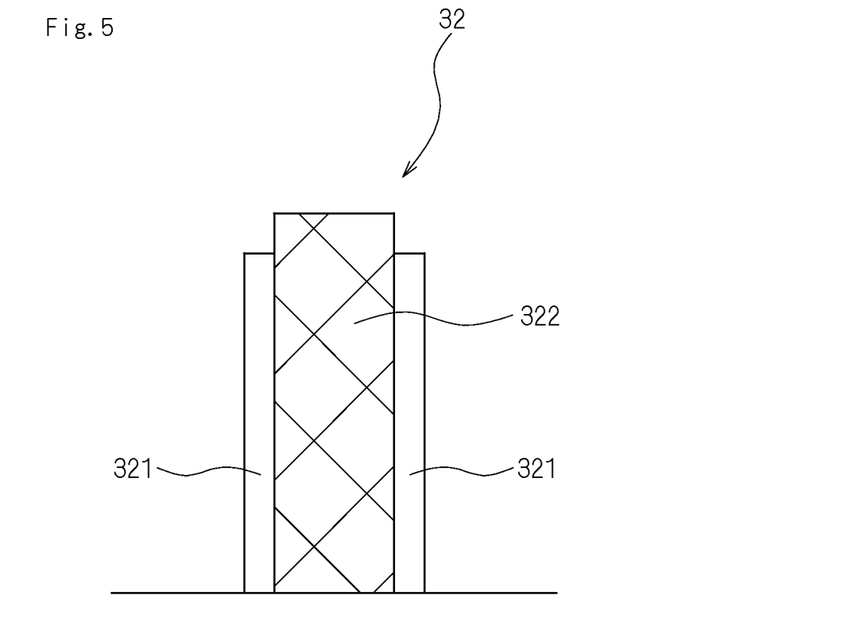
FIG. 5 is a schematic cross-sectional view showing the structure of the partition portion of the rotary-drum type magnetic separator according to the first embodiment of the invention.

FIG. 5 is a schematic cross-sectional view showing the structure of the partition portion 32 of the rotary-drum type magnetic separator according to the first embodiment of the invention. As shown in FIG. 5, a non-woven fabric material 322 such as felt is inserted into the gap between two plate members 321 and 321 of the partition portion 32. It is preferable that the height of the non-woven fabric material 322 be larger than the heights of the two plate members 321 interposing the non-woven fabric material 322 therebetween so that the end portion of the non-woven fabric material comes into contact with the outer peripheral surface of the rotary drum 3. This is to prevent a gap from being formed between the outer peripheral surface of the rotary drum 3 and the end portion of the non-woven fabric material 322 when the non-woven fabric material 322 is pressed against the rotary drum 3. Since a gap is not formed between the outer peripheral surface of the rotary drum 3 and the end portion of the non-woven fabric material 322, sludge, which is an unnecessary material contained in the used coolant, adheres to the non-woven fabric material 322 and is blocked. Accordingly, only coolant, which has passed through the non-woven fabric material 322, permeates the drive chamber.

Further, as described above, a rubber material may be filled instead of the non-woven fabric material 322 such as felt or a gel-like resin material or the like may be filled. In this case, not only sludge contained in the used coolant but also coolant is difficult to permeate the drive chamber.

According to the above-mentioned first embodiment, the partition portions 32 function as filters preventing an unnecessary material, which is contained in the used coolant, from moving to the flow passages 16b, which are formed near both end portions of the rotary drum 3, from the flow passage 16a that is formed near the middle portion of the rotary drum. Accordingly, sludge, which is an unnecessary material, cannot pass through the partition portions 32 and does not enter the flow passages 16b that are formed near both end portions of the rotary drum 3. As a result, it is possible to inhibit sludge from remaining and being deposited near both end portions of the rotary drum 3. Moreover, flows are also generated in the flow passages 16b formed near both end portions of the rotary drum 3 as in the flow passage 16a formed near the middle portion of the rotary drum 3 and a uniform flow can be generated as a whole. Accordingly, the deterioration of the recovery efficiency of sludge is not caused.

Second Embodiment

Since the basic structure of a rotary-drum type magnetic separator according to a second embodiment of the invention is the same as that according to the first embodiment, the same elements are denoted by the same reference numerals and the detailed description thereof will be omitted. The second embodiment is different from the first embodiment in that a material inhibiting the permeation of sludge is not inserted into or filled in a gap between two plate members 321 and 321 of a partition portion 32 and a plate-like rubber member is used.

Figure 6:
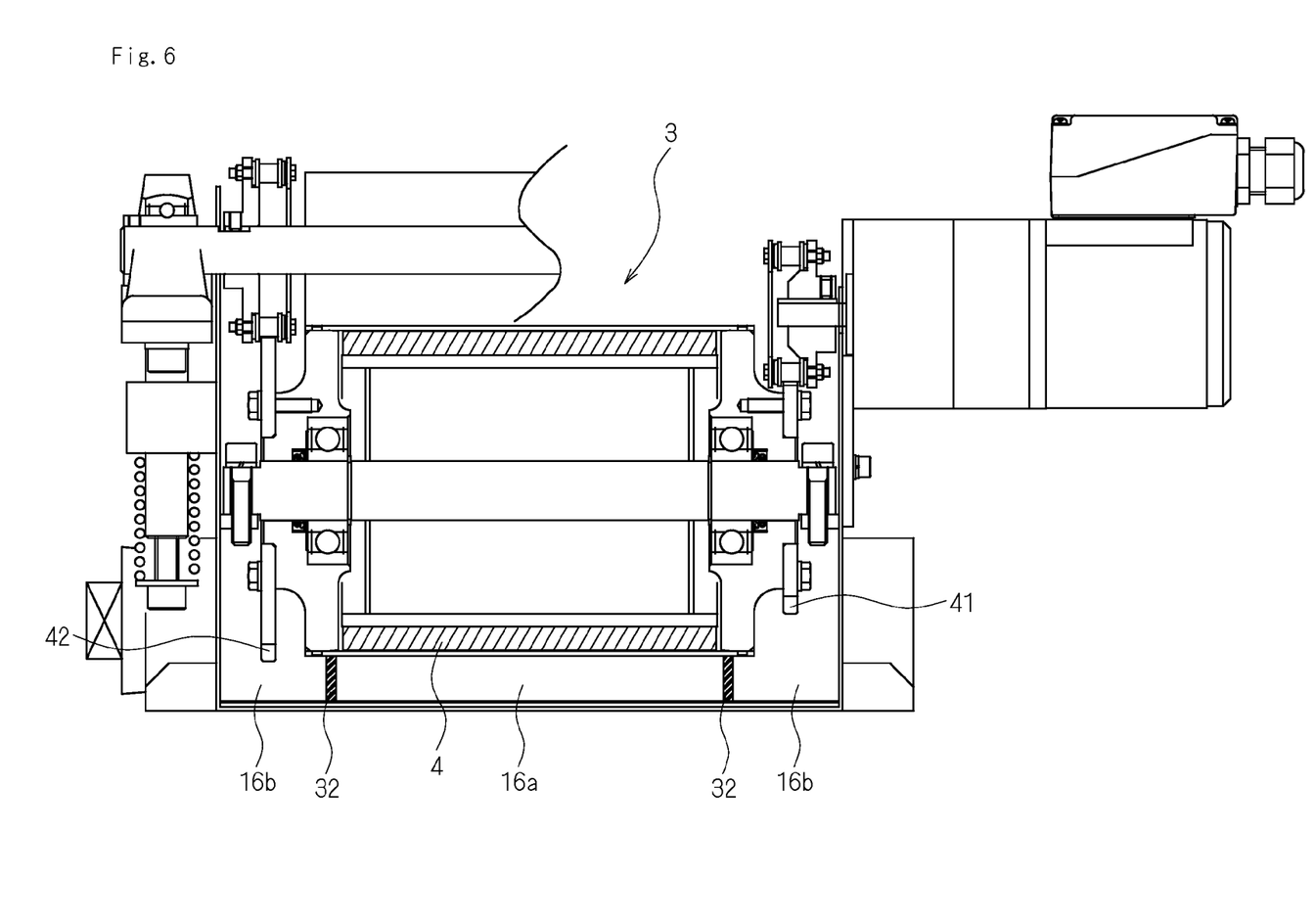
FIG. 6 is a cross-sectional view, which shows the structure of the rotary-drum type magnetic separator according to the second embodiment of the invention, taken along a vertical plane passing through the central axis of a rotary drum.

FIG. 6 is a cross-sectional view, which shows the structure of the rotary-drum type magnetic separator according to the second embodiment of the invention, taken along a vertical plane passing through the central axis of a rotary drum 3. As shown in FIG. 6, a flow passage 16 in which used coolant flows is formed in the middle portion of the rotary drum 3, and drive chambers, which receive a driving sprocket 41 and a driven sprocket 42 transmitting the rotation of a motor rotating the rotary drum 3, are formed at both end portions of the rotary drum 3 by partition portions 32. The drive chambers are filled with coolant but sludge, which is an unnecessary material contained in the used coolant, is blocked by the partition portions 32. Accordingly, sludge cannot permeate the drive chambers. Therefore, it is possible to reduce degradation that occurs due to the abrasion or the like of a driving sprocket 41 or a driven sprocket 42 caused by sludge.

Figure 7A:
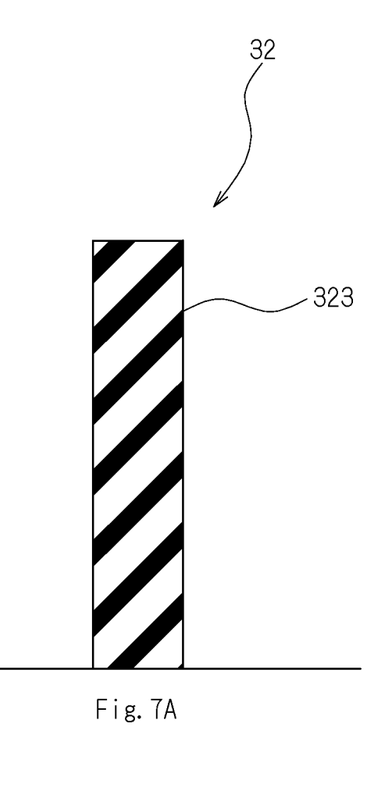
FIG. 7 is a schematic cross-sectional view showing the structure of the partition portion of the rotary-drum type magnetic separator according to the second embodiment of the invention.

FIG. 7 is a schematic cross-sectional view showing the structure of the partition portion 32 of the rotary-drum type magnetic separator according to the second embodiment of the invention. As shown in FIG. 7A, the partition portion 32 is formed of a plate-like rubber member 323. It is preferable that the height of the plate-like rubber member 323 be larger than a distance between the bottom of the flow passage 16 and the outer peripheral surface of the rotary drum 3 so that the end portion of the plate-like rubber member 323 comes into contact with the outer peripheral surface of the rotary drum 3. This is to prevent a gap from being formed between the outer peripheral surface of the rotary drum 3 and the plate-like rubber member 323 when the plate-like rubber member 323 is pressed against the rotary drum 3. Since a gap is not formed between the outer peripheral surface of the rotary drum 3 and the plate-like rubber member 323, the permeation of the used coolant containing sludge is inhibited by the plate-like rubber member 323. Of course, since liquid tightness does not need to be rigorously maintained, a part of the used coolant permeates the drive chambers. However, since sludge has been excluded by the plate-like rubber member 323, there is no problem.

Figure 7B:
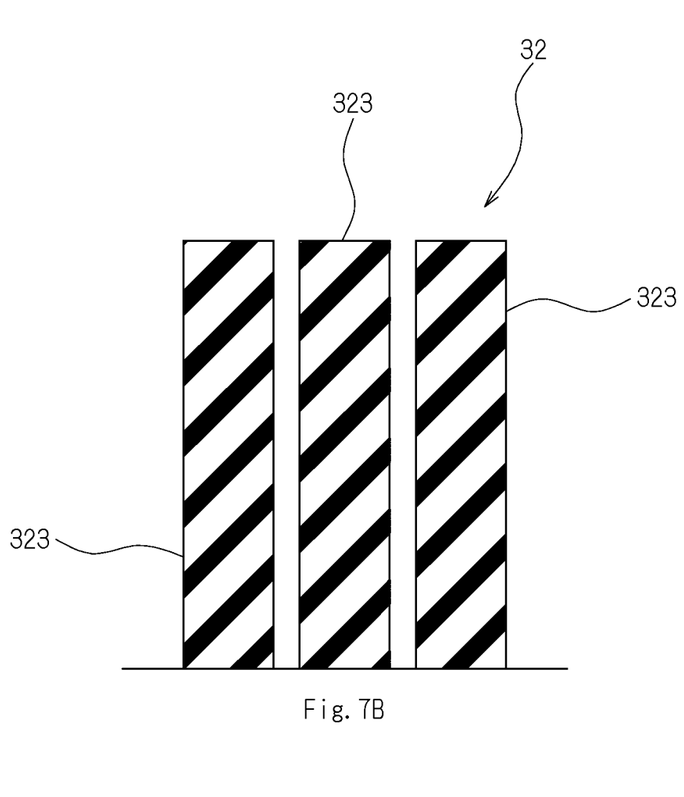

Further, the partition portion 32 may be formed of a plurality of plate-like rubber members 323 that are disposed in parallel at a predetermined interval as shown in FIG. 7B. Of course, since the height of each of the plate-like rubber members 323 is larger than a distance between the bottom of the flow passage 16 and the outer peripheral surface of the rotary drum 3, a gap is not formed between the outer peripheral surface of the rotary drum 3 and the plate-like rubber members 323. Accordingly, the permeation of the used coolant containing sludge is inhibited by the plate-like rubber members 323.

Meanwhile, there is a concern that the plate-like rubber members 323 may be significantly deformed by the pressure applied from the rotary drum 3. In this case, it is undeniable that a part of sludge contained in the used coolant may permeate. However, since the plurality of plate-like rubber members 323 are disposed in parallel at a predetermined interval sufficient for sludge to sink as shown in FIG. 7B, a part of sludge having permeated sinks in the gaps between the plate-like rubber members 323. Accordingly, it is possible to inhibit sludge from permeating the drive chamber.

According to the above-mentioned second embodiment, each of the partition portions 32 is formed of one or a plurality of plate-like rubber members 323. When each of the partition portions 32 is formed of the plurality of plate-like rubber members 323, the plate-like rubber members 323 are disposed in parallel at a predetermined interval. Since the rubber member 323 is made of a rubber material, the outer peripheral surface of the rotary drum 3 and the end portion of the partition portion 32 can easily come into contact with each other. Since the outer peripheral surface of the rotary drum 3 and the end portion of the partition portion 32 come into contact with each other, a gap is not formed between the partition portion 32 and the outer peripheral surface of the rotary drum 3. Therefore, sludge, which is an unnecessary material, does not enter the flow passages 16b that are formed near both end portions of the rotary drum 3. As a result, it is possible to inhibit sludge from remaining and being deposited in the flow passages 16b formed near both end portions of the rotary drum 3. Moreover, even if a part of sludge enters, sludge sinks in the gaps between the plurality of plate-like rubber members 323 since the plurality of plate-like rubber members 323 are disposed in parallel at a predetermined interval. Accordingly, sludge does not enter the flow passages 16b that are formed near both end portions of the rotary drum 3. As a result, it is possible to inhibit sludge from permeating the drive chambers.

Meanwhile, the plate-like rubber members 323 are disposed in parallel in the second embodiment, but, for example, a plurality of plate-like non-woven fabric materials may be disposed in parallel. In this case, it is possible to inhibit sludge from entering the flow passages 16b that are formed near both end portions of the rotary drum 3, but coolant from which sludge has been excluded enters the flow passages 16b.

Third Embodiment

Since the basic structure of a rotary-drum type magnetic separator according to a third embodiment of the invention is the same as those according to the first and second embodiments, the same elements are denoted by the same reference numerals and the detailed description thereof will be omitted. The third embodiment is different from the first and second embodiments in that a material inhibiting the permeation of sludge or a plurality of members disposed in parallel are not used as a partition portion 32 and a plurality of plate-like steel members each of which has a height allowing a gap to be formed between the outer peripheral surface of the rotary drum 3 and itself are disposed in parallel.

Figure 8:
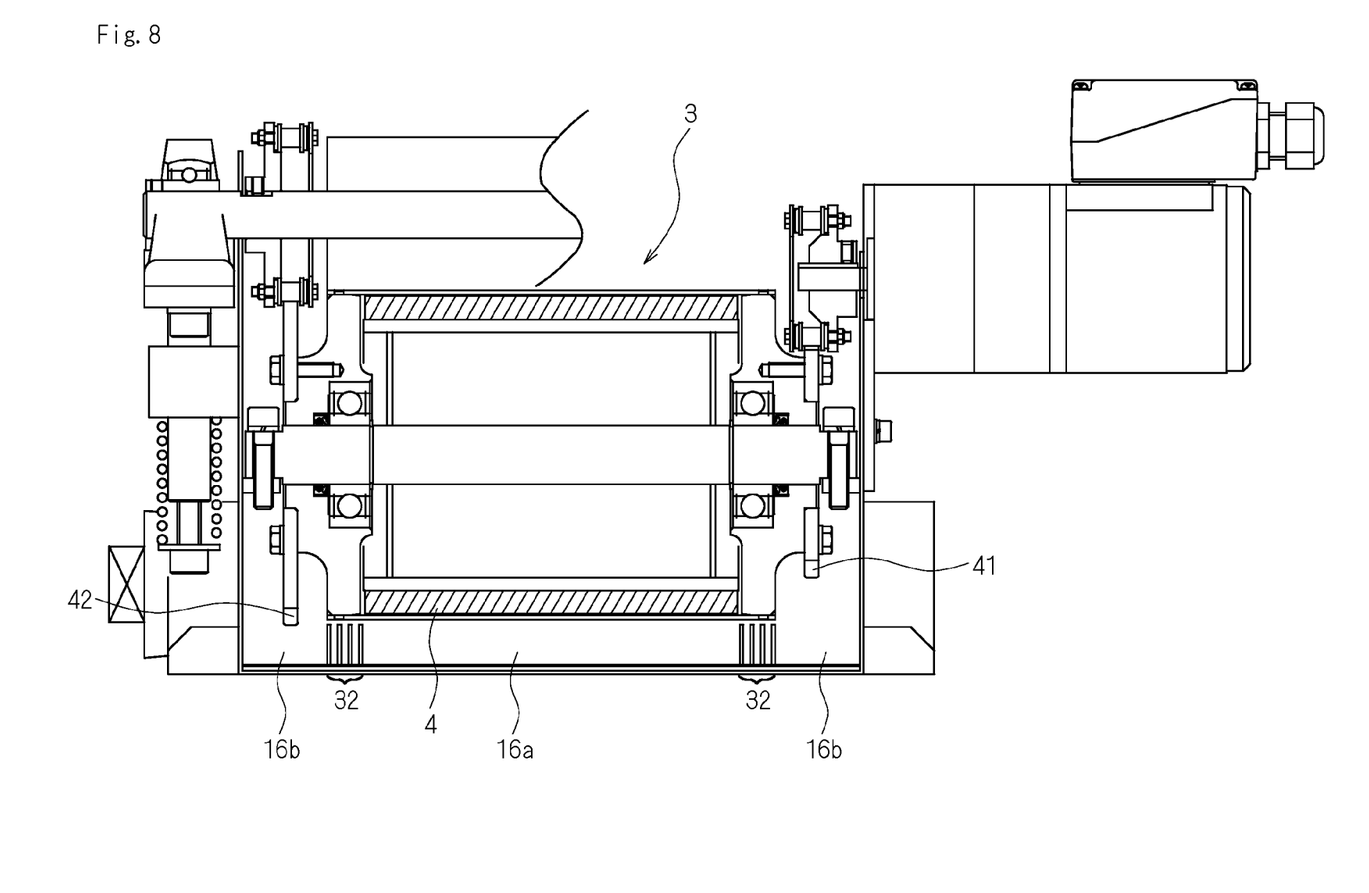
FIG. 8 is a cross-sectional view, which shows the structure of the rotary-drum type magnetic separator according to the third embodiment of the invention, taken along a vertical plane passing through the central axis of a rotary drum.

FIG. 8 is a cross-sectional view, which shows the structure of the rotary-drum type magnetic separator according to the third embodiment of the invention, taken along a vertical plane passing through the central axis of a rotary drum 3. As shown in FIG. 8, a flow passage 16 in which used coolant flows is formed in the middle portion of the rotary drum 3, and drive chambers, which receive a driving sprocket 41 and a driven sprocket 42 transmitting the rotation of a motor rotating the rotary drum 3, are formed at both end portions of the rotary drum 3 by partition portions 32. The drive chambers are filled with coolant but sludge, which is an unnecessary material contained in the used coolant, is blocked by the partition portions 32. Accordingly, sludge cannot permeate the drive chambers. Therefore, it is possible to reduce degradation that occurs due to the abrasion or the like of a driving sprocket 41 or a driven sprocket 42 caused by sludge.

Figure 9:
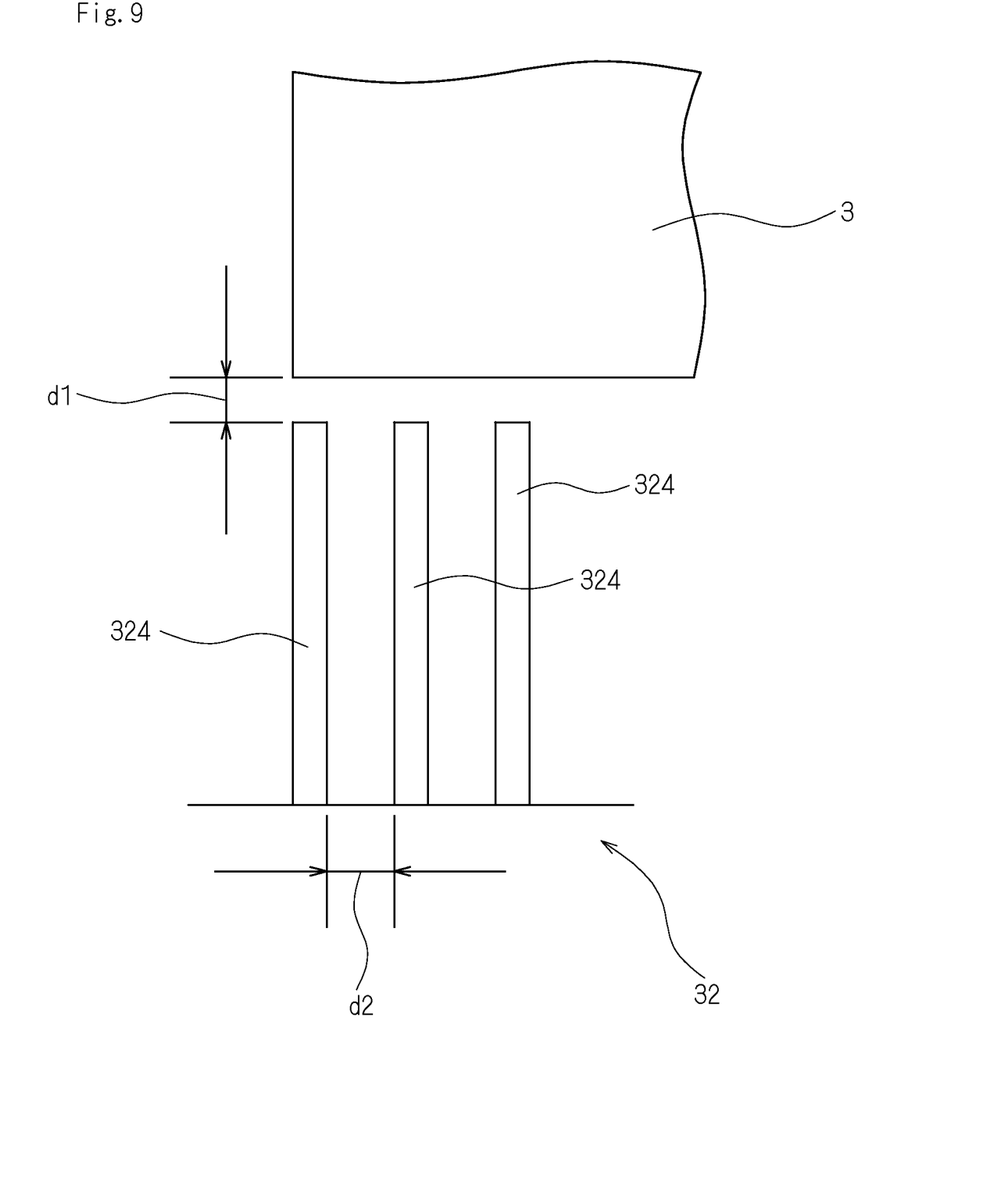
FIG. 9 is a schematic cross-sectional view showing the structure of the partition portion of the rotary-drum type magnetic separator according to the third embodiment of the invention.

FIG. 9 is a schematic cross-sectional view showing the structure of the partition portion 32 of the rotary-drum type magnetic separator according to the third embodiment of the invention. As shown in FIG. 9, the partition portion 32 is formed of a plurality of plate-like steel members 324 that are made of, for example, stainless steel. The height of each of the plate-like steel members 324 is smaller than a distance between the bottom of a flow passage 16 and the outer peripheral surface of the rotary drum 3 so that the end portion of each of the plate-like steel members 324 comes into contact with the outer peripheral surface of the rotary drum 3. Accordingly, gaps are formed between the plate-like steel members 324 and the outer peripheral surface of the rotary drum 3.

It is preferable that a distance d1 of the gap between the end portion of each plate-like steel member 324 and the outer peripheral surface of the rotary drum 3 be smaller than an interval d2 of the plurality of plate-like steel member 324 disposed in parallel. The reason for this is that sludge, of which the particle size is set so that the sludge passes through the gap, necessarily sinks in the gaps between the plurality of plate-like steel members 324 disposed in parallel at a predetermined interval. Accordingly, even though a gap is formed between the outer peripheral surface of the rotary drum 3 and the end portion of the plate-like steel member 324, it is possible to inhibit sludge from permeating the drive chamber. Of course, even if one plate-like steel member 324 is provided, it is possible to effectively inhibit sludge from passing through the gap according to the setting of the distance d1 of the gap.

According to the above-mentioned third embodiment, each of the partition portions 32 is formed of one or a plurality of plate-like steel members 324. When each of the partition portions 32 is formed of the plurality of plate-like steel members 324, the plate-like steel members 324 are disposed in parallel at a predetermined interval. Since the plurality of plate-like steel members 324 are disposed in parallel at a predetermined interval, sludge, which passes through the gaps between the outer peripheral surface of the rotary drum 3 and the end portions of the plate-like steel members 324, sinks in the gaps between the plurality of plate-like steel members 324 disposed in parallel at a predetermined interval. Accordingly, sludge does not enter the flow passages 16b that are formed near both end portions of the rotary drum 3. As a result, it is possible to inhibit sludge from permeating the drive chambers.

Meanwhile, the invention is not limited to the above-mentioned embodiments, and may be modified and improved in various ways without departing from the scope of the invention.

It should be understood that the invention is not limited to the above-described embodiment, but may be modified into various forms on the basis of the spirit of the invention. Additionally, the modifications are included in the scope of the invention.

What is claimed is:
1. A rotary-drum type magnetic separator that includes a rotary drum on which a plurality of magnets are disposed and separates an unnecessary material contained in used coolant, the rotary-drum type magnetic separator comprising:
 a pair of partition portions that are provided below both end portions of the rotary drum and partition a flow passage, in which the used coolant flows, into a flow passage that is formed near the middle portion of the rotary drum and flow passages that are formed near both end portions of the rotary drum; and openings that are formed at lower portions of the flow passages partitioned by the partition portions, wherein the partition portions function as filters preventing the unnecessary material of the used coolant from moving to the flow passages, which are formed near both end portions of the rotary drum, from the flow passage that is formed near the middle portion of the rotary drum.

2. The rotary-drum type magnetic separator according to claim 1, wherein each partition portion is made of a plate-like non-woven fabric, and is formed so that an end portion of each partition portion comes into contact with the outer peripheral surface of the rotary drum.

3. The rotary-drum type magnetic separator according to claim 2, wherein the plate-like non-woven fabric of each partition portion is interposed between two plate-like steel members.

4. The rotary-drum type magnetic separator according to claim 1, wherein each partition portion is formed of one or a plurality of plate-like rubber members, and when each partition portion is formed of the plurality of plate-like rubber members, the plate-like rubber members are disposed in parallel at a predetermined interval.

5. The rotary-drum type magnetic separator according to claim 1, wherein each partition portion is formed of one or a plurality of plate-like steel members, and when each partition portion is formed of the plurality of plate-like steel members, the plate-like steel members are disposed in parallel at a predetermined interval.

6. The rotary-drum type magnetic separator according to claim 1, wherein each portion is formed by filling a gap, which is formed between two plate-like steel members, with at least one of a resin material and a rubber material.

* * * * *